May 13, 1952　　　H. H. RANNEY　　　2,596,723
THREAD-CUTTING MECHANISM
Filed May 16, 1947　　　　　　　　　　5 Sheets-Sheet 1

Inventor
Herbert H. Ranney
by Wright Brown Quinby May
Attys.

May 13, 1952  H. H. RANNEY  2,596,723
THREAD-CUTTING MECHANISM
Filed May 16, 1947  5 Sheets-Sheet 2

May 13, 1952 H. H. RANNEY 2,596,723
THREAD-CUTTING MECHANISM
Filed May 16, 1947 5 Sheets-Sheet 3

May 13, 1952 H. H. RANNEY 2,596,723
THREAD-CUTTING MECHANISM
Filed May 16, 1947 5 Sheets-Sheet 4

Inventor
Herbert H. Ranney
by Wright, Brown, Quinby & May
Attys.

May 13, 1952 H. H. RANNEY 2,596,723
THREAD-CUTTING MECHANISM
Filed May 16, 1947 5 Sheets-Sheet 5

Inventor
Herbert H. Ranney

Patented May 13, 1952

2,596,723

UNITED STATES PATENT OFFICE 2,596,723

THREAD-CUTTING MECHANISM

Herbert H. Ranney, Windsor, Vt., assignor to Cone Automatic Machine Company, Inc., Windsor, Vt., a corporation of Vermont Application May 16, 1947, Serial No. 748,455

10 Claims. (Cl. 29—57)

This invention relates to mechanism for cutting threads, either internal or external, and has for an object to provide such a mechanism applicable as an attachment for a multiple spindle lathe, for cutting threads at one or more of the tooling stations.

A further object is to increase the accuracy of thread cutting by controlling the tool by a lead screw and nut.

Still another object is to provide a thread cutting mechanism in which lead screws of various forms may be used selectively depending upon the type and lead of threads which it is desired to cut.

Still another object is to provide adjustment of the axial position of the lead screw so that threads may be cut at the desired axial portion of the work and yet avoid the necessity of an excessively long lead screw in order to cover the range of axial positions where thread cutting may be desired.

A further object of the invention is to provide, if desired, for the use of a rotary milling cutter driven from the drive mechanism of the machine for cutting the threads, although a non-rotating chaser may be used instead of the rotary cutter if desired.

Further objects and advantages will appear from a description of certain embodiments of the invention shown in the accompanying drawings in which:

Figure 22 is a view similar to Figure 21, but showing cutting of external threads.

This invention has been illustrated as embodied in an attachment to a multiple spindle lathe of the well known Cone type in which the work-holding spindles are arranged in circular series about the axis of a spindle carrier, this carrier being indexed to bring the spindles successively into various tooling positions. This attachment may be applied at any of the tooling positions desired.

Figures 1, 2, 3:
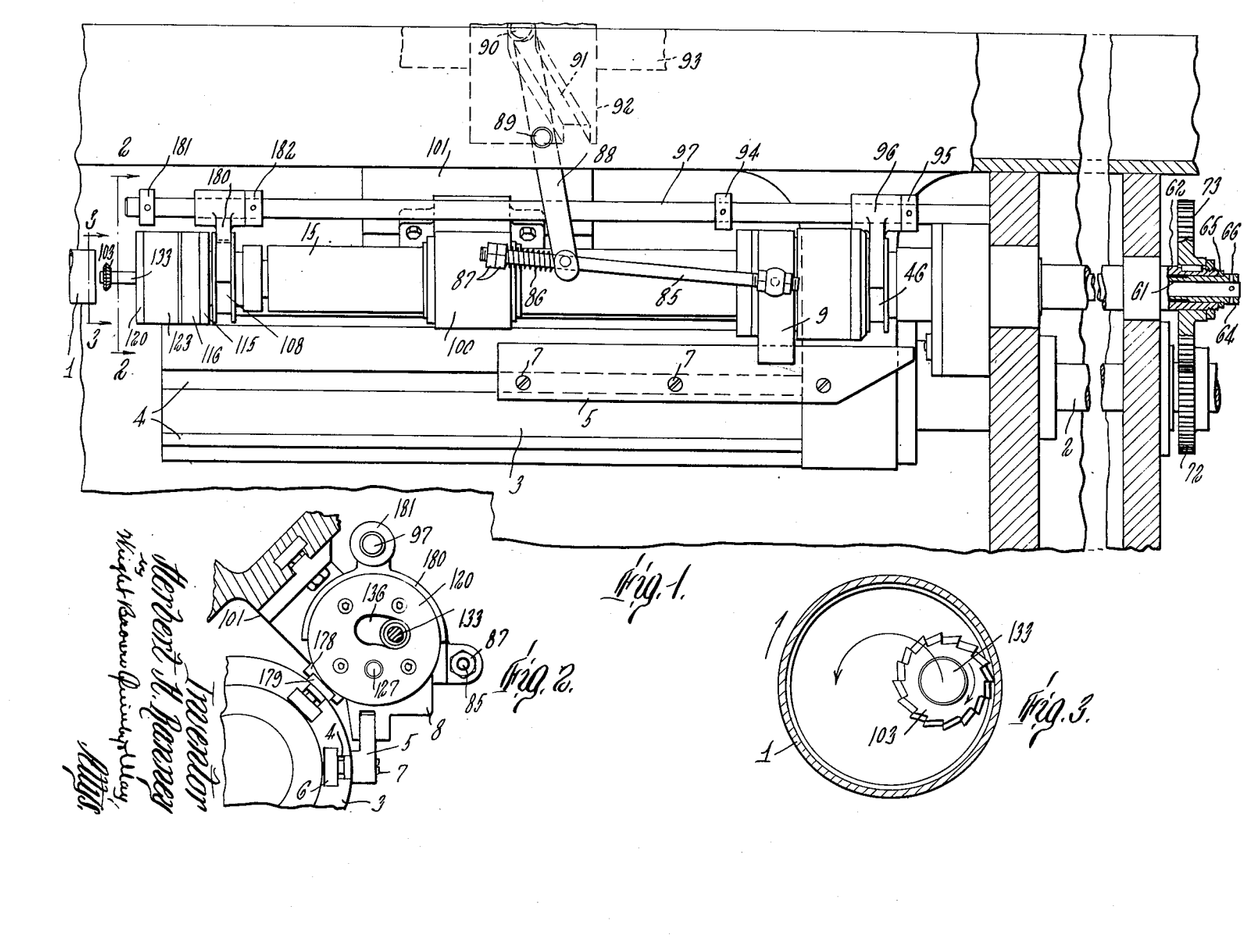
Figure 1 is a fragmentary front elevation partly broken away and in section of a multiple spindle lathe embodying the invention as applied to internal thread milling.
Figures 2 and 3 are detail sectional views on lines 2—2 and 3—3, respectively, of Figure 1.

One of the work spindles is shown as supporting a work piece at 1 in Figure 1 at one tooling station. The work spindles are rotated by any suitable means and a portion of the drive means for such rotation comprises a shaft 2 arranged coaxial with the spindle carrier and from which the spindles are rotated, as by geared connections as is well known in the art. Slidable axially of this shaft 2 is a tool slide 3 of well known construction provided with longitudinally extending T slot ways 4 in its periphery as shown in Figure 2, these slots being angularly spaced in accordance with the spacing of the spindles in the spindle carrier. One of these slots 4 is shown as provided with a guide piece 5 secured as by T nuts 6 and screws 7. The guide piece 5 has slidably bearing thereon a slotted guide portion 8 of a yoke 9, this yoke 9 thus being held against rotation, but being capable of sliding motion axially along the guide piece 5.

Figures 8, 9, 10, 11, 12:
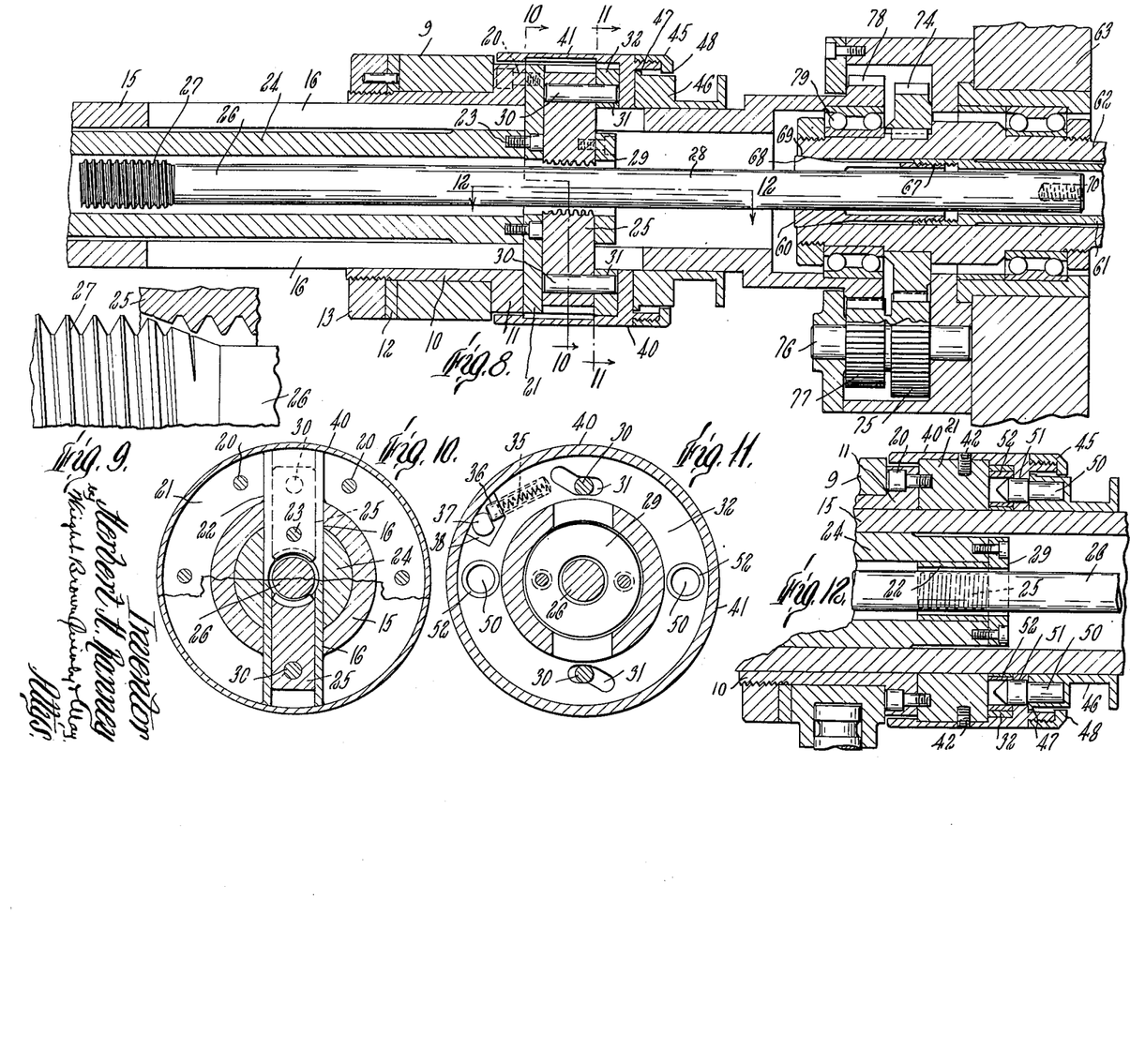
Figure 8 is a central longitudinal sectional view of the portion of the mechanism to the rear of that shown in Figure 4.
Figure 9 is a somewhat diagrammatic view to a larger scale of a portion of the lead screw and a cooperating nut portion close to each other but out of engagement.
Figures 10, 11 and 12 are detail sectional views on the correspondingly numbered section lines of Figure 8.

Within the yoke 9 is journaled a sleeve 10 (see Figure 8) between an end flange 11 thereof and a collar 12 pinned to a nut 13, threaded on one end portion of the sleeve 10. The sleeve 10 is carried by a quill 15 which extends in the direction of the work spindles, and as shown, is coaxial with one of them at one of the tooling stations. The quill 15 is longitudinally slotted as at 16. To the rear face of the end flange 11 there is secured, as by screws 20, a ring 21 (see Figure 10) having guide portions 22 extending inwardly through the slots 16 through the quill 15, this ring 21 being secured as by screws 23 to the rear end of a tool spindle 24 coaxial within the quill 15. Within the guide portions 22 are positioned opposed nut segments 25 which are movable radially toward and from a lead screw 26 having a threaded end portion 27 and a reduced diameter shank 28. These segments are held in their guideways by a ring 29 secured as by screws to the outer end of the spindle 24, as best shown in Figure 12. Each of these segments 25 has a rearwardly extending pin 30 which rides in an angle slot 31 in a ring 32. The angle slots 31 are so positioned that when the pins 30 ride in the inner portions of these slots, the segments 25 are positioned inwardly so related that when the threaded portion 27 of the lead screw is opposite thereto, they are in driven relation to the lead screw. In the position shown in Figure 8, the spindle 24 is retracted and the lead screw portion 27 is out of driving relation to these nut segments.

The ring 32 is normally urged away from the angular position shown in Figure 11 by a spring 35 seated in a socket in the ring 32 and pressing a plunger 36 against a pin 37. This pin 37 rides in a slot 38 through the ring 32 and projects forwardly from a collar 40, having a circular marginal flange portion 41 which encloses the ring 32, the segments and their guideways, and the flange 11. This flange 41 is held from rotation relative to the spindle 24 by being secured, as by screws 42 (see Figure 12), to a portion of the member 21 which, in turn, is keyed to the spindle 24 by means of the portion 22 which extends through the quill slots 16. This member 40 is slidable axially with its assembly on the outside of the spindle 24 and has threaded on its rear end a collar 45 which projects over and inwardly toward a spool 46. This spool 46 is slidable axially on the quill between its position abutting the member 40 shown, and a retracted position where an annular external shoulder 47 thereon abuts the in-turned flange 48 of the collar 45. Carried by the spool 46 are a pair of conical ended plugs 50 which are slidable through openings 51 through the member 40, these plugs thus acting to key the spool against relative rotation with respect to the member 40. The conical inner ends of these plugs may engage in bushed openings 52 through the ring 32. When these plugs 51 are engaged in these bushings, the ring 32 is held in the position shown in Figure 11 with the pins 30 in the inner portions of the slots 31 and with the segments 25 locked in their inward positions where they will engage the threaded portion 27 of the lead screw when this portion is opposite to the segments. By withdrawing the spool 46 longitudinally, however, these pins 50 may be withdrawn from the bushings 52, whereupon the spring 35 turns the ring 32 to bring the pins 30 toward the outer ends of the slots 31, causing the segments to spring outwardly into inoperative positions. This angular extent of motion of the ring 32 is insufficient to bring the bushings 52 entirely out of registry with the conical ends of the plugs 50 so that on returning the spool 46 to its former position these tapered ends wedge the ring 32 to rock it about its axis and move the segments 25 into operative positions. When in these positions cylindrical portions of the plugs 50 engage within the bushings and act to lock the segments in position.

The lead screw 26 may be adjustably held in the desired axial position so that the segments will engage its threaded portion at the position where a thread cutting tool is in proper relation to the work, as will later appear, and in order that the lead screw may be so held, it is carried in a spring collet 60 (see Figure 8) which is attached to a sleeve 61, this sleeve extending through a hollow shaft 62 which is journaled in a frame portion 63 of the machine against axial motion. The outer end of the sleeve 61 is provided with an enlarged diameter portion 64 (Figure 1) which engages a washer 65 opposite to the end of the shaft 62, and this enlarged portion 64 is provided with transverse perforations 66 through which a tool may be inserted to permit rotation of the sleeve 61, this rotation acting on the threaded connection at 67 with the collet 60 so as to either free it or clamp it against the shank 28 of the lead screw by reason of the mating inclined faces 68 and 69 of the collet and shaft 62, respectively.

The rear end of the shank 28 may have a threaded socket 70 (Figure 8) into which may be screwed the forward end of a rod (not shown) which may extend out through the rear end of the shaft 62 and by manipulation of which the lead screw may be moved axially when the collet 60 has been released so that when the threaded portion 27 of the lead screw has been positioned at the desired point, the collet 60 may again be tightened up and the lead screw held against axial sliding motion. The rod engaged in the socket 70 may then be removed from the machine.

It is, of course, necessary that a relative rotation between the lead screw and the segments 25 shall take place in order to produce axial motion of the tool spindle to produce the lead of the threads. To this end the shaft 62 is arranged to be rotated from the shaft 2 by which the work spindles are driven and at the same speed. This is accomplished by means of the intermeshing gears 72 and 73, respectively, carried by the shaft 2 and the shaft 62. The tool spindle is rotated from the shaft 62 but at a different speed in order to produce the lead from the relative rotation between the lead screw and its nut segments. For this purpose, the shaft 62 has keyed thereto a gear 74 which meshes with a pinion 75 carried by a stub shaft 76. This stub shaft 76 also carries a pinion 77 which meshes with a gear portion 78 at the rear end of the quill 15. This quill is also journaled on the forward end of the shaft 62 on the ball bearings 79. It will be noted that the gears 74 and 78 are of different size and mesh with gears 75 and 77 which are also of different size, and by reason of this the quill, and through the members 22, the spindle 24, also, and the shaft 62 are driven at a differential velocity.

The head which carries the nut segments and the tool spindle 24 is moved to bring the threading tool to the proper place longitudinally on the work for threading operation and to bring the nut segments 25 into controlled relation to the threaded portion of the lead screw by yielding mechanism connected to the yoke 9. As shown in Figure 1, this comprises a link 85 which is pivotally connected to the yoke 9 at its rear end and has a spring 86 at its forward end seated against a pair of nuts 87 threaded thereon. Engaging the rear end of this spring is the lower end of a lever 88 fulcrumed at 89 on the frame of the machine, the upper end of this lever 88 carrying a cam follower 90 riding in a cam groove 91 of a cam drum 92 fixed to the overhead cam shaft 93 by the rotation of which many of the machine operations are controlled, as is well known in the art.

The axial motion of the tool spindle also acts to control the clamping and releasing of the nut segments. To this end, the spool 46 is engaged by a yoke 96 slidably mounted on a stationary bar 97 between a pair of limit collars 94 and 95 fixed thereon. When the yoke 96 is moved rearwardly into the position shown in Figure 1, the yoke 96 is stopped by impingement against the collar 95 so that the spool 46 is moved to the position shown in Figures 8 and 12, forcing the nut segments to their inner operative positions. When the yoke 96 is moved forwardly, it first brings the nut segments into engagement with the threaded portion 27, Figure 9, showing these parts just before meshing relation, the adjacent portions being tapered as shown so as to facilitate proper engagement, and when the nut segments do take hold, further forward motion of the tool spindle is controlled by such engagement, the link 85 sliding thereafter, if need be, relative to the lever 88. After the tool has cut threads to the desired depth and had been freed therefrom, as will later appear, the yoke 96 engages the stop collar 94, retracting the spool 46 from the position shown in Figures 8 and 12 and allowing the segments to spring outwardly out of contact with the lead screw.

Threading tools which may be employed for cutting threads, as by the lead screw and nut segments, are illustrated in Figures 4 to 19. In Figures 1 to 7, the tool is shown as a rotary milling cutter 103 arranged to cut internal threads in the work piece. The sleeve 15 which surrounds the spindle 24 is rotatably supported in a bearing 100 bolted to a stationary frame member 101. At its forward end the spindle 24 receives thereinto a tubular shank 105 of a tool carrying head 106, the shank being secured as by a screw and check nut 104. This head 106 has a portion 107 of a diameter intermediate to that of the forward portion and the shank 105, and on this is axially slidable a spool 108 provided with a cross pin 109 extending through a slot 110 through the portion 107 and which extends through a hole 111 in a sleeve 112 and through a headed shaft 113 within the sleeve 112. The shaft 113 and the sleeve 112 thus may slide axially with respect to the shank 105 and the spindle 24 to an extent limited by the length of the slot 110.

Figures 4, 5, 6, 7:
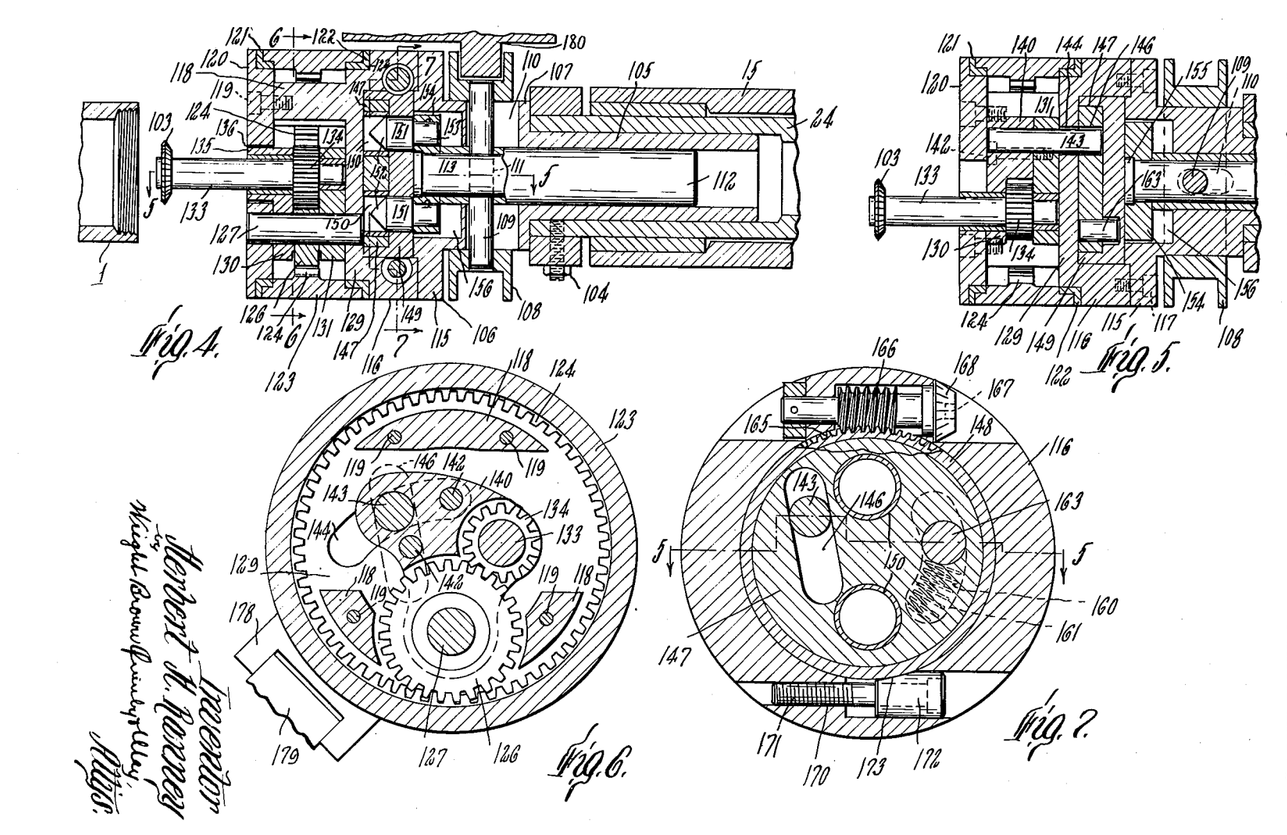
Figure 4 is a fragmentary central sectional view through the head portion of the threading attachment.
Figures 5, 6 and 7 are detail sectional views taken on the correspondingly numbered section lines of Figure 4, Figures 6 and 7 being drawn to larger scale and Figure 5 also being a sectional view on line 5—5 of Figure 7.

The head 106 comprises a pair of members 115 and 116 which are secured together as by screws 117 (see Figure 5). The member 116 has forwardly projecting webs 118 to which is secured, as by screws 119, the cover plate 120. Back of the cover plate and between angular bearing rings 121 and 122 there is journaled a ring 123 which has an internal gear portion 124. Meshing with this gear portion 124 is a gear 126 carried by a pivot pin 127, which is journaled in the cover plate 120 and a cross partition portion 129 of the member 116. This pin 127 has fulcrumed thereon a pair of arms 130 and 131 at either side of the gear 126. The gear 126 meshes with a pinion 134 on a tool spindle 133. This spindle 133 is journaled in suitable bushings, the one in the arm 131 and the other in a hub 135 of the arm 130 and which extends out through a slot 136 through the face plate 120, as shown best in Figure 2. The arm 130 has a thickened portion 140 which engages the face of the arm 131 (see Figures 5 and 6) and it is secured thereto as by means of screws 142 and a pin 143. The pin 143 extends through a curved slot 144 through the cross web 129 of the member 116 and through a straight slot 146 through a disk 147 which is journaled within a rim 148 extending from a second disk 149. The forward disk 147 is provided with a pair of spaced bushed holes 150 therethrough within which may extend the forward ends of a pair of plugs 151 having conical forward ends 152, and shanks 153 which are seated in suitable openings in a ring 154 positioned back of the disk 149 and seated in a cylindrical housing 156 in the head portion 115. The ring member 154 is engaged by the head 155 of the shank member 113, so that when this shank member is retracted it is moved therewith and pulls the plugs 151 backwardly, bringing their forward ends out of registry within the bushed openings 150 of the disc 147. This permits a spring 160 seated in a curved slot 161 (see Figure 7) in the disk 149 and engaging a pin 163 projecting into this slot from the disk 147 to cause limited rotation of the disk 147, which acting upon the pin 143, rocks the arms 130 and 131 in a direction to move the tool spindle 133 inwardly in the slot 136 away from the inner face of the work piece and inwardly from the position shown in Figure 2. The spindle 133 may be forced outwardly in this slot by forcing the conical ends 152 of the plugs 151 into the bushed openings 150, and the extent to which this tool spindle is moved outwardly is dependent upon the angular position of the disk 149 relative to the tool head. This is adjustable by means shown in Figure 7. The rim 148 of this disk 149 is provided at one portion of its periphery with worm teeth as shown at 165 in Figure 7, and with these teeth there meshes a worm 166 journaled in the member 116 and accessible at one end for turning by a suitable tool (not shown) which engages in a socket 167 in its outer end. This socket 167 is in a head 168 shown as provided with graduations so that the angular position of this worm at any time can be readily determined. When the angular position of the disk 149 has been adjusted to the desired position it may be locked in this position by tightening a screw 170 threaded at 171 into the member 116 and extending through a bushing 172 slabbed off on one side as at 173 where it may act as a clamping brake shoe contacting with the rim 148.

When the spool 107 is in its forward position shown in Figure 4, the tool spindle 133 is in its outer position where the milling tool 103 carried thereby is in position to act on the work. When the thread cutting has been done to the desired depth, the spool 108 is held from further forward motion with the tool head, which causes a retraction of the pins 151, finally releasing the member 133 for retraction from the work preparatory to backing off.

The internal gear ring 123 is held from rotation with the spindle 24, and for this purpose it may be provided with a fork 178 which slidably engages a rail 179 bolted to the tool carrier 3 in the proper angular position and in one of the longitudinal T slots with which this tool carrier is provided, as previously described. The spool 108 is engaged by a yoke 180 slidable axially on the rod 97 between the fixed stops 181 and 182. When this yoke contacts the rear stop 182, further retraction of the work head moves the milling tool outwardly into operative position, and when it contacts the stop 181 on the forward motion of the milling cutter, it acts to retract the plugs 151 causing automatic retraction of the milling cutter from the work. The parts are so set that as the threading tool is advanced from its retracted position toward the work, the first part of this motion is done by the action of the cam 92, under resilient pressure. When the tool comes near to the work, the nut segments come into engagement with the threads of the lead screw so that further feed motion of the tool is under control of the lead screw and nut. The tool is now in its outer position and is rotating so that it engages the work, rotating about its own axis and at the same time turning about the interior of the work piece and progressing axially, the relative rotations between the tool and the work being as shown by the arrows in Figure 3.

When the threading has been done to the desired extent, the yoke 180 is stopped by impingement upon the fixed collar 181, this acting to release the threading tool so that it snaps toward the axis of the work and away from cutting relation thereto. Next, the lead segments are freed from the lead screw by the action of the yoke 96 on the spool 46 so that the lead nut segments spring out of contact with the lead screw and the positive forward feed of the tool is stopped. The cam 92 then takes over and retracts the tool substantially axially away from the work and while out of contact therewith. Adjacent to its retractive limit of motion, the yokes 180 and 96 contacting with their respective stationary collars 182 and 95, respectively, close the nut segments to their operative positions and swing the cutting tool out to its threading position so that on subsequent advance of the tool, when it next reaches a work piece, it begins to cut the threads thereon.

In Figures 13 to 16, a modification of the tool head is illustrated in which a rotary thread cutting mill is arranged to cut external threads. The member 115 is like the member 115 shown in Figures 4 and 5, but adjacent thereto, the member 200 is substituted for the member 116. This member 200 has an arcuate web 201 extending forwardly therefrom to which is secured, as by the screws 202, a cover plate 203 having a slot 204 therethrough. Journaled between the rear face of the cover 203 and the member 200 is an internal ring gear 205 with which meshes a gear 206 journaled on a pin 207. This pin forms a rocking axis of a pair of arms 208 and 209, the arm 208 being pinned to the fulcrum pin 207. The gear 206 meshes with a gear 210 on a cutter spindle 211 which is journaled in the arms 208 and 209. The arms 208 and 209 have a pin 215 which rides through a curved slot 216 in the transverse wall member 217 of the member 200 and also passes into a straight slot 219 in a disk 220. This disk 220 is journaled within the flange 221 of a disk 222, and the disk 222 is arranged for angular adjustment as by rotation of a worm 225 and is locked in adjusted angular position by locking mechanism similar to that shown in Figure 7. The ring gear 205 is held against rotation as by the guide 224 similar to the ring gear 123, by the guide 178 and as the spindle 24 rotates, the head rotates therewith so that the gear 206 rotates in planetary relation to the internal gear 205. A plug 226 with a tapered end 227 is slidably guided through the disk 222 and its inner tapered end may bear within a sleeved opening 230 in the disk 220. The rear end of the pin 226 is secured in a ring 231 which is employed in place of the ring 154 shown in Figure 4.

Figure 13:
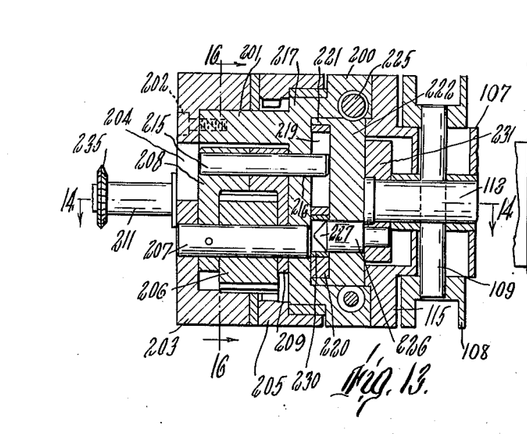
Figure 13 is a view similar to Figure 4, but showing a head for external thread milling.
Figure 14:
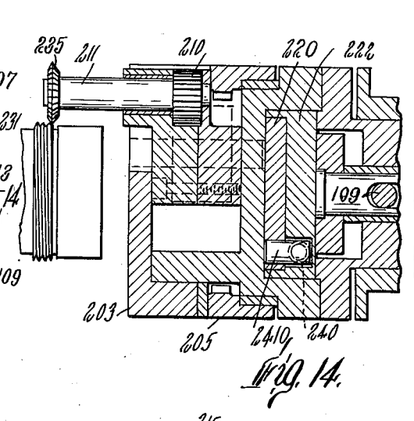
Figures 14 and 16 are sectional views on lines 14—14 and 16—16, respectively, of Figure 13.
Figure 15:
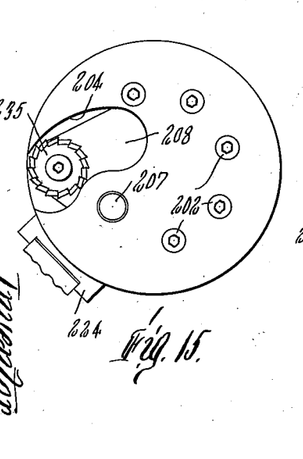
Figure 15 is a front end elevation of the head of Figures 13 and 14.
Figure 16:
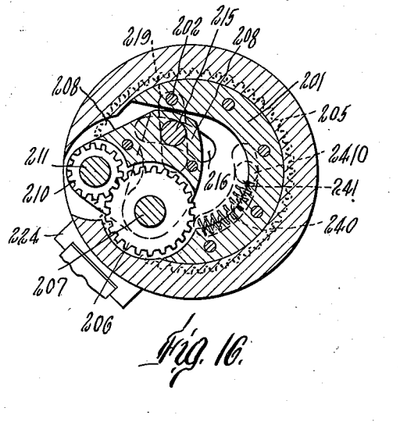

When the plug 226 is in the axial position shown in Figure 13, its tapered end engaging in the opening 230, the thread cutting mill 235 carried by the spindle 211 is in its inward position shown in Figure 14, but by pulling rearwardly on the ring 231, the plug 226 is pulled out of its locking position and the mill is moved outwardly away from the periphery of the work by a spring 240 seated in an arcuate slot 241 in the disk 222 and engaging a pin 2410 projecting from the disk 220. The action of this mechanism is similar to that previously described, with the exception that the thread cutting mill is moved inwardly to operate on the work instead of being moved outwardly, and it moves outwardly when released to free the work instead of being moved inwardly to release it, as in the case of the internal thread milling cutter.

Figures 17, 18:
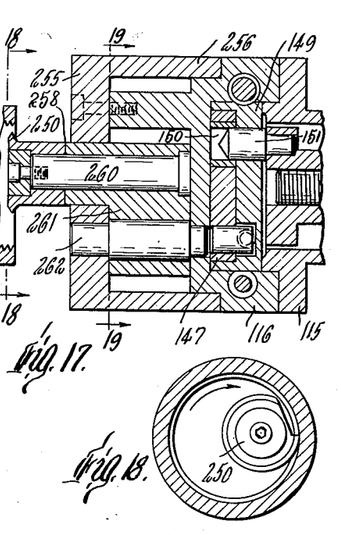
Figure 17 is a view similar to Figure 4, but showing a modification for internal thread chasing.
Figures 18 and 19 are detail sectional views on lines 18—18 and 19—19, respectively, of Figure 17.
Figure 19:
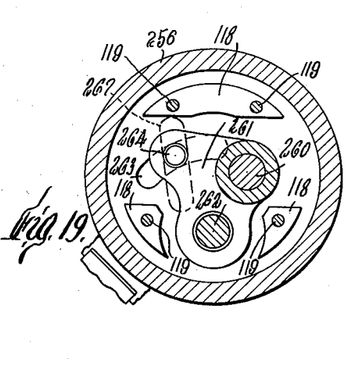
Figure 23:
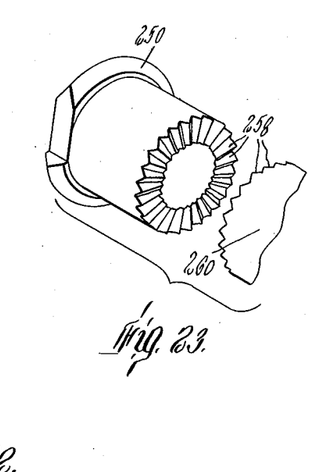
Figure 23 is an exploded perspective view showing a non-rotating cutting tool or chaser, as in Figure 18, and the spindle end on which the chaser is mounted.
Figure 26:
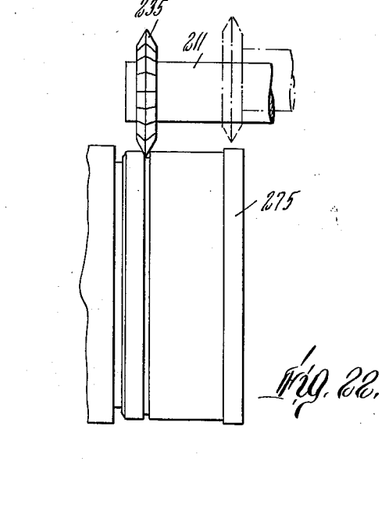

In Figures 17, 18 and 19 a further modification is shown in which a non-rotating chaser 250 is employed for cutting internal threads. The members 115 and 116 of the construction shown in Figures 4 to 7 are here employed, but in place of the ring gear 129, the front cap 255 is provided with an annular flange 256 which directly engages the forward face of the member 116 around its periphery. The disks 147 and 149 may be used as in the construction of Figure 4, together with their locking plugs and spring mechanism for throwing the cutting tool out of operative position. The cutting tool, which is shown as a non-rotary chaser, is fixed to a tool post 260 and locked by mating serrations 258 (Figure 23) on the chaser and the tool post, which post is carried by an arm 261 journaled on the arbor 262, which extends between the cover plate 255 and the member 116. The arm 261 carries the tool post 260, as shown in Figure 19, and also a pin 264 which extends through the arcuate slot 263 of the part 116 and into the straight slot 267 of the disk 147. The action of this head is similar to that shown in Figures 4 to 7, except that the tool is not rotated about its axis, but is given a gyratory motion as the tool spindle rotates while the work spindle is rotated as shown in Figure 18.

Figure 20:
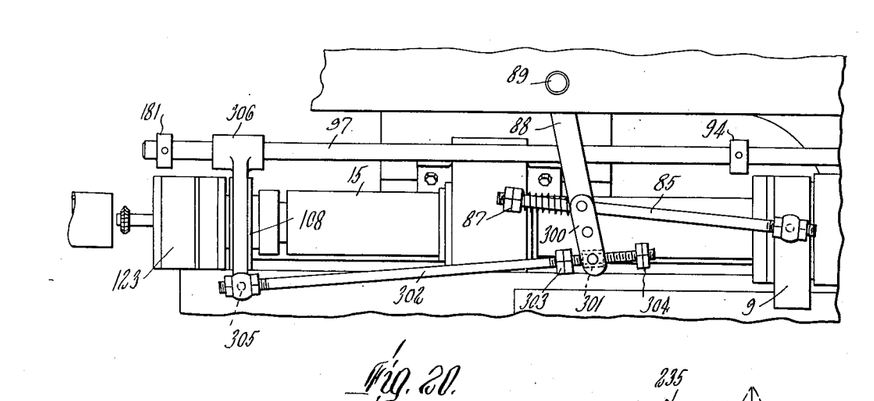
Figure 20 is a view similar to a portion of Figure 1, but showing a modified construction.
Figure 21:
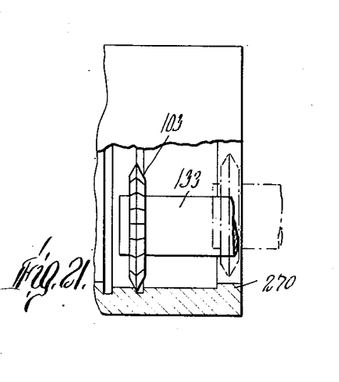
Figure 21 is a fragmentary view partly in side elevation and partly broken away, through a work piece and showing an internal thread cutting tool at the start of the thread cutting operation, the tool being shown in dotted lines somewhat retracted.

In some cases it may be desired that the thread cutting tool shall not be moved laterally into operative position on retraction of the tool head, but that it shall be held retracted until the tool has been advanced axially to about the point where it is desired to start the thread cutting operation. This will permit internal threading of a portion of the work piece of larger internal diameter than nearer to the mouth of the opening in the work piece as shown in Figure 21, the work piece being shown as provided with a reduced diameter portion 270, or the external threading of a portion of a work piece of smaller diameter than a portion nearer to the starting end of the work piece as shown in Figure 22, in which there is an external larger diameter shoulder 275. When this is desired, the cam actuated lever 88 may be provided with an extension 300 pivotally supporting at its lower end a swivel stud 301, as shown in Figure 20, this stud being slidable on a rod 302 between pairs of check nuts 303 and 304 threaded thereon. The forward end of the rod 302 is pivoted at 305 to a yoke 306 which takes the place of the yoke 180 shown in Figure 1. The stop collar 182 of Figure 1 is omitted from the bar 97 so that the tool is not returned laterally to operative position when the tool head is retracted. On the subsequent forward swing of the lever 88, which advances the tool head, the lower end of the extension 300 travels faster than the tool head, being further from the fulcrum 89, and also faster than the feed from the lead screw if this is engaged, so that when its stud 301 impinges on the nuts 303, it moves the rod 302 forwardly relative to the tool head and moves the spool 108 relative to this head to the left, which moves the tool laterally into cutting relation to the work piece. Either the stop collar 181 on which the yoke 306 may impinge, or the nuts 304 on which the swivel stud 301 may impinge on reverse motion of the lever 88, may be employed to release the tool to spring laterally away from the work when thread cutting has proceeded to the desired point.

From the foregoing description of certain embodiments of this invention, it will be understood by those skilled in the art that various further changes and modifications might be made without departing from its spirit or scope.

I claim:

1. In combination with a rotary work spindle, of a tool spindle arranged coaxial with said work spindle and rotatably and axially movable, a hollow rotary shaft coaxial with said tool spindle, means supporting said shaft against axial motion, a collet within said shaft, said shaft having a tapered bore cooperating with said collet to close said collet by axial motion of said collet in one direction and permitting said collet to open on motion of said collet in the opposite direction, means for so moving said collet, a lead screw having a shank portion adjustable axially through said collet and arranged to be gripped thereby when said collet is closed, a nut segment carried by said tool spindle for lateral motion into and out of driven relation to said lead screw and held against axial motion relative to said tool spindle to cause axial motion of said tool spindle when said segment is in said relation and said lead screw is rotated relative to said tool spindle, means for so rotating said shaft and lead screw, and a thread cutting tool carried by said tool spindle for cutting threads on work carried by said work-holding spindle during such rotation of said shaft and lead screw.

2. In combination with a rotary work spindle, of a tool spindle arranged in the direction of said work spindle and movable axially, a rotary shaft extending in the direction of said spindles but held against axial motion, a lead screw rotatable with said shaft, a nut segment carried by said tool spindle and movable into and out of driven relation to said lead screw and causing axial motion of said tool spindle by rotation of said screw when said segment is in driven engagement therewith and said shaft is rotated relative to said tool spindle, a tool carried by said tool spindle and movable laterally of said work holding spindle into and out of operative relation to work carried by said work holding spindle, and means for moving said segment into engagement with said lead screw while said tool is in advanced position and for first retracting said tool from advanced position and thereafter moving said segment out of engagement with said lead screw.

3. In combination with a rotary work spindle, of a tool spindle arranged in the direction of said work spindle and movable axially, a rotary shaft extending in the direction of said spindles but held against axial motion, a lead screw rotatable with said shaft, a nut segment carried by said tool spindle and movable into and out of driven relation to said lead screw and causing axial motion of said tool spindle by rotation of said screw when said segment is in driven engagement therewith and said shaft is rotated relative to said tool spindle, a tool carried by said tool spindle and movable laterally of said work holding spindle into and out of operative relation to work carried by said work holding spindle, means for moving said segment into engagement with said lead screw while said tool is in advanced position and for first retracting said tool from advanced position and thereafter moving said segment out of engagement with said lead screw, said tool being a rotary tool, means driven from said tool spindle for rotating said tool, and means for rotating said tool spindle.

4. In combination with a work spindle, a tool spindle extending in the same direction as said work spindle and movable axially, a tool head at one end of said tool spindle, means supporting said head for axial but non-rotary motion, a rotary shaft having its axis extending in the direction of said spindles and held against axial motion, a lead screw carried by said shaft and coaxial with said tool spindle, a nut element carried by said tool spindle and movable laterally of its axis into and out of cooperative relation to said screw, a threading tool carried by said head and mounted for motion laterally of said axis, means for advancing said head yieldingly to bring said tool toward operative axial relation to work carried by said work spindle and for moving said nut element into cooperative relation to said screw whereupon further advance of said head is controlled by said screw and nut element, and means for moving said tool laterally of said axis out of cutting relation to the work after a predetermined amount of thread cutting by said tool.

5. In combination with a work spindle, a tool spindle extending in the same direction as said work spindle and movable axially, a tool head at one end of said tool spindle, means supporting said head for axial but non-rotary motion, a rotary shaft having its axis extending in the direction of said spindles and held against axial motion, a lead screw carried by said shaft and coaxial with said tool spindle, a nut element carried by said tool spindle and movable laterally of its axis into and out of cooperative relation to said screw, a threading tool carried by said head and mounted for motion laterally of said axis, means for advancing said head yieldingly to bring said tool toward operative axial relation to work carried by said work spindle and for moving said nut element into cooperative relation to said screw whereupon further advance of said head is controlled by said screw and nut element, and means effective at the end of the desired thread cutting to first move said tool laterally out of cutting position and then retract said nut element from said lead screw and then retract said head.

6. In combination with a rotary work holding spindle, a rotary tool spindle extending in the same direction as said work holding spindle and movable axially, a tool head at one end of said tool spindle, means supporting said head for axial but non-rotary motion, a rotary shaft having its axis extending in the direction of said spindles and held against axial motion, a lead screw carried by said shaft and coaxial with said tool spindle, means for rotating said tool spindle and shaft at different speeds, a nut element carried by said tool spindle and movable laterally of its axis into and out of cooperative relation to said screw, a rotary threading tool carried by said head and mounted for motion laterally of said axis, means for advancing said head yieldingly to bring said tool toward operative axial relation to work carried by said work spindle and for moving said nut element into cooperative relation to said screw whereupon further advance of said head is controlled by said screw and nut, means effective at the end of the desired thread cutting to first move said tool laterally out of cutting position, then retract said nut from said lead screw, and then retract said head, and means actuated by rotation of said tool spindle to rotate said tool.

7. In combination with a rotary work holding spindle, a rotary tool spindle extending in the same direction as said work holding spindle and movable axially, a tool head at one end of said tool spindle, means supporting said head for axial but non-rotary motion, a rotary shaft having its axis extending in the direction of said spindles and held against axial motion, a lead screw carried by said shaft and coaxial with said tool spindle, means for rotating said tool spindle and shaft at different speeds, a nut element carried by said tool spindle and movable laterally of its axis into and out of cooperative relation to said screw, a rotary threading tool carried by said head and mounted for motion laterally of said axis, means for advancing said head yieldingly to bring said tool toward operative axial relation to work carried by said work spindle and for moving said nut element into cooperative relation to said screw whereupon further advance of said head is controlled by said screw and nut, means effective at the end of the desired thread cutting to first move said tool laterally out of cutting position, then retract said nut from said lead screw, and then retract said head, means actuated by the retraction of said head to advance said tool laterally into cutting position, and means actuated by rotation of said tool spindle to rotate said tool.

8. In combination with a rotary work spindle, a tool spindle arranged in the direction of said work spindle and movable axially, a rotary shaft extending in the direction of said spindles but held against axial motion, a lead screw rotatable with said shaft, a nut segment carried by said tool spindle and movable into and out of driven relation to said lead screw and causing axial motion of said tool spindle by rotation of said screw when said segment is in driven engagement therewith and said shaft is rotated relative to said tool spindle, a tool carried by said tool spindle and movable laterally of said work-holding spindle into and out of operative relation to work carried by said work-holding spindle, means for moving said segment into or out of position to engage said lead screw and for moving said tool laterally of the work to and from operative position in timed relation to each other and in desired axial positions of said tool, said tool being a rotary tool, means driven from said tool spindle for rotating said tool, and means for rotating said tool spindle.

9. In combination with a work spindle, a tool spindle extending in the same direction as said work spindle and movable axially, a tool head at one end of said tool spindle, means supporting said head for axial but non-rotary motion, a rotary shaft having its axis extending in the direction of said spindles and held against axial motion, a lead screw carried by said shaft and coaxial with said tool spindle, a nut element carried by said tool spindle and movable laterally of its axis into and out of cooperative relation to said screw, a threading tool carried by said head and mounted for motion laterally of said axis, means for advancing said head yieldingly to bring said tool toward operative axial relation to work carried by said work spindle and for moving said nut element into cooperative relation to said screw whereupon further advance of said head is controlled by said screw and nut element, and means for moving said tool laterally of said axis into or out of cutting relation to the work at predetermined positions of said tool head.

10. In combination with a rotary work holding spindle, a rotary tool spindle extending in the same direction as said work holding spindle and movable axially, a tool head at one end of said tool spindle, means supporting said head for axial but non-rotary motion, a rotary shaft having its axis extending in the direction of said spindles and held against axial motion, a lead screw carried by said shaft and coaxial with said tool spindle, means for rotating said tool spindle and shaft at different speeds, a nut element carried by said tool spindle and movable laterally of its axis into and out of cooperative relation to said screw, a rotary threading tool carried by said head and mounted for motion laterally of said axis, means for advancing said head yieldingly to bring said tool toward operative axial relation to work carried by said work spindle and for moving said nut element into cooperative axial relation to said screw whereupon further advance of said head is controlled by said screw and nut, means for then moving said tool laterally to bring said tool into lateral cutting position, means effective at the end of the desired thread cutting to first move said tool laterally out of cutting position, then retract said nut from said lead screw, and then retract said head, means actuated by the retraction of said head to move said nut element into cooperative lateral position, and means actuated by rotation of said tool spindle to rotate said tool.

HERBERT H. RANNEY.

REFERENCES CITED

The following references are of record in the file of this patent:

UNITED STATES PATENTS

| Number | Name | Date |
|---|---|---|
| 1,877,056 | Rupple | Sept. 13, 1932 |
| 2,069,098 | Rupple | Jan. 26, 1937 |
| 2,161,548 | Miller | June 6, 1939 |
| 2,266,338 | Sheaffer | Dec. 16, 1941 |
| 2,376,164 | Miller et al. | May 15, 1945 |
| 2,451,497 | Kratchman | Oct. 19, 1948 |